United States Patent
Seto et al.

(10) Patent No.: US 10,346,292 B2
(45) Date of Patent: Jul. 9, 2019

(54) SOFTWARE COMPONENT RECOMMENDATION BASED ON MULTIPLE TRACE RUNS

(71) Applicant: Microsoft Technology Licensing, LLC, Redmond, WA (US)

(72) Inventors: Tetsuo Seto, Redmond, WA (US); Russell Krajec, Loveland, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 15/036,338

(22) PCT Filed: Mar. 27, 2014

(86) PCT No.: PCT/IB2014/060239
§ 371 (c)(1),
(2) Date: May 12, 2016

(87) PCT Pub. No.: WO2015/071777
PCT Pub. Date: May 21, 2015

(65) Prior Publication Data
US 2016/0283362 A1    Sep. 29, 2016

Related U.S. Application Data

(60) Provisional application No. 61/903,755, filed on Nov. 13, 2013, provisional application No. 61/903,762, (Continued)

(51) Int. Cl.
*G06F 9/44* (2018.01)
*G06F 11/36* (2006.01)
(Continued)

(52) U.S. Cl.
CPC ............ *G06F 11/3688* (2013.01); *G06F 8/70* (2013.01); *G06F 11/3409* (2013.01);
(Continued)

(58) Field of Classification Search
CPC ............ G06F 11/3636; G06F 11/3466; G06F 11/3476; G06F 2201/865; G06F 11/3409
(Continued)

(56) References Cited

U.S. PATENT DOCUMENTS

| | | | |
|---|---|---|---|
| 5,293,620 A | 3/1994 | Barabash et al. | |
| 5,327,568 A | 7/1994 | Maejima et al. | |

(Continued)

FOREIGN PATENT DOCUMENTS

| | | |
|---|---|---|
| CN | 101616428 | 12/2009 |
| CN | 101627388 | 1/2010 |

(Continued)

OTHER PUBLICATIONS

"International Search Report Issued in PCT Application No. PCT/US2014/011798", dated Jun. 20, 2014, 3 pages.
(Continued)

*Primary Examiner* — Chuck O Kendall
(74) *Attorney, Agent, or Firm* — Workman Nydegger

(57) ABSTRACT

Recommendations may be generated while calculating performance metrics from multiple uses of a software component. A tracing service may collect trace data from multiple uses of a software component, where each use may be done on different conditions. The performance metric analysis may identify various factors that may affect the performance of a software component, then present those factors to a user in different delivery mechanisms. In one such mechanism, a recommended set of hardware and software configurations may be generated as part of an operational analysis of a software component.

18 Claims, 12 Drawing Sheets

Related U.S. Application Data filed on Nov. 13, 2013, provisional application No. 61/903,768, filed on Nov. 13, 2013.

(51) Int. Cl.
*G06F 16/2455* (2019.01)
*G06F 11/34* (2006.01)
*G06F 8/70* (2018.01)

(52) U.S. Cl.
CPC ...... *G06F 11/3466* (2013.01); *G06F 16/2455* (2019.01); *G06F 11/3428* (2013.01); *G06F 2201/865* (2013.01)

(58) Field of Classification Search
USPC .................................. 717/100–120, 128–140
See application file for complete search history.

(56) References Cited

U.S. PATENT DOCUMENTS

| | | |
|---|---|---|
| 5,642,511 A | 6/1997 | Chow et al. |
| 5,732,277 A | 3/1998 | Kodosky et al. |
| 5,740,440 A | 4/1998 | West |
| 5,758,183 A | 5/1998 | Scales |
| 5,778,004 A | 7/1998 | Jennion et al. |
| 5,835,085 A | 11/1998 | Eick et al. |
| 5,852,449 A | 12/1998 | Esslinger et al. |
| 5,946,488 A | 8/1999 | Tanguay et al. |
| 5,999,192 A | 12/1999 | Selfridge et al. |
| 6,003,143 A | 12/1999 | Kim et al. |
| 6,026,362 A | 2/2000 | Kim et al. |
| 6,038,395 A | 3/2000 | Chow et al. |
| 6,108,340 A | 8/2000 | Rolfe |
| 6,202,199 B1 | 3/2001 | Wygodny et al. |
| 6,219,826 B1 | 4/2001 | De Pauw et al. |
| 6,226,787 B1 | 5/2001 | Serra et al. |
| 6,243,857 B1 | 6/2001 | Logan et al. |
| 6,266,804 B1 | 7/2001 | Isman |
| 6,282,701 B1 | 8/2001 | Wygodny et al. |
| 6,374,271 B1 | 4/2002 | Shimizu |
| 6,560,773 B1* | 5/2003 | Alexander, III .... G06F 11/3466 707/999.202 |
| 6,661,431 B1 | 12/2003 | Stuart |
| 6,681,384 B1 | 1/2004 | Bates et al. |
| 6,742,003 B2 | 5/2004 | Heckerman et al. |
| 6,748,585 B2 | 6/2004 | Proebsting |
| 6,775,423 B2 | 8/2004 | Kulkarni |
| 6,792,460 B2 | 9/2004 | Oulu |
| 6,792,595 B1 | 9/2004 | Storistenau et al. |
| 6,862,727 B2 | 3/2005 | Stevens |
| 6,938,186 B2 | 8/2005 | Das et al. |
| 7,058,928 B2 | 6/2006 | Wygodny et al. |
| 7,093,234 B2 | 8/2006 | Hibbeler et al. |
| 7,120,901 B2 | 10/2006 | Ferri et al. |
| 7,174,536 B1 | 2/2007 | Kothari et al. |
| 7,194,664 B1 | 3/2007 | Fung et al. |
| 7,203,925 B1 | 4/2007 | Michael et al. |
| 7,219,300 B2 | 5/2007 | Arquie |
| 7,386,839 B1 | 6/2008 | Golender et al. |
| 7,468,727 B2 | 12/2008 | Wong |
| 7,472,378 B2 | 12/2008 | Bennett |
| 7,509,343 B1 | 3/2009 | Washburn |
| 7,543,281 B2 | 6/2009 | King et al. |
| 7,574,675 B1 | 8/2009 | Linker |
| 7,607,169 B1 | 10/2009 | Njemanze et al. |
| 7,620,947 B2 | 11/2009 | Krishnaswamy |
| 7,624,380 B2 | 11/2009 | Okada |
| 7,639,256 B1 | 12/2009 | Yablonski |
| 7,650,574 B2 | 1/2010 | Nattinger |
| 7,657,873 B2 | 2/2010 | Horton et al. |
| 7,681,182 B1 | 3/2010 | Mistry et al. |
| 7,788,640 B2 | 8/2010 | Grimaldi |
| 7,814,453 B2 | 10/2010 | Stevens et al. |
| 7,827,539 B1 | 11/2010 | Wygodny et al. |
| 7,853,930 B2 | 12/2010 | Mitchell et al. |
| 7,865,872 B2 | 1/2011 | Chamieh et al. |
| 7,921,410 B1* | 4/2011 | Symons ............ G06F 11/3452 717/124 |
| 8,024,708 B2 | 9/2011 | Demetriou |
| 8,032,866 B1 | 10/2011 | Golender et al. |
| 8,056,059 B2 | 11/2011 | Chockler |
| 8,069,145 B2 | 11/2011 | Surtani |
| 8,286,142 B2 | 10/2012 | Fjeldstad et al. |
| 8,312,056 B1 | 11/2012 | Peng et al. |
| 8,312,435 B2 | 11/2012 | Wygodny et al. |
| 8,316,354 B2 | 11/2012 | Vanrenen |
| 8,359,584 B2 | 1/2013 | Rao et al. |
| 8,381,178 B2 | 2/2013 | Martino et al. |
| 8,406,565 B1 | 3/2013 | Schildan |
| 8,490,055 B2 | 7/2013 | Basak |
| 8,495,598 B2 | 7/2013 | Gounares et al. |
| 8,516,443 B2 | 8/2013 | Li |
| 8,543,983 B2 | 9/2013 | Murthy |
| 8,572,575 B2 | 10/2013 | Berlyant et al. |
| 8,595,743 B2 | 11/2013 | Gounares et al. |
| 8,607,018 B2 | 12/2013 | Gounares et al. |
| 8,615,766 B2 | 12/2013 | Gounares et al. |
| 8,640,100 B2 | 1/2014 | Neumann et al. |
| 8,640,104 B2 | 1/2014 | McEntee |
| 8,650,538 B2 | 2/2014 | Gounares et al. |
| 8,656,134 B2 | 2/2014 | Gounares et al. |
| 8,656,135 B2 | 2/2014 | Gounares et al. |
| 8,656,359 B2 | 2/2014 | Savov |
| 8,656,378 B2 | 2/2014 | Gounares et al. |
| 8,694,574 B2 | 2/2014 | Gounares et al. |
| 8,681,155 B2 | 3/2014 | Basak |
| 8,700,838 B2 | 4/2014 | Gounares et al. |
| 8,707,326 B2 | 4/2014 | Garrett |
| 8,713,064 B1 | 4/2014 | Khafizov |
| 8,726,255 B2 | 5/2014 | Gounares et al. |
| 8,745,591 B2 | 6/2014 | De Smet et al. |
| 8,745,594 B1 | 6/2014 | Iossiphidis |
| 8,752,021 B2 | 6/2014 | Li et al. |
| 8,752,034 B2 | 6/2014 | Gounares et al. |
| 8,756,581 B2 | 6/2014 | Castanos et al. |
| 8,793,656 B2 | 7/2014 | Huang |
| 8,943,441 B1 | 1/2015 | Patrick |
| 8,966,452 B2 | 2/2015 | Gataullin et al. |
| 8,990,777 B2 | 3/2015 | Gounares |
| 8,997,056 B2 | 3/2015 | Li et al. |
| 9,256,969 B2 | 2/2016 | Krajec |
| 9,280,841 B2 | 3/2016 | Krajec |
| 9,292,415 B2 | 3/2016 | Seto et al. |
| 9,298,588 B2 | 3/2016 | Seto et al. |
| 9,298,589 B2 | 3/2016 | Gautallin et al. |
| 9,311,213 B2 | 4/2016 | Seto et al. |
| 9,323,863 B2 | 4/2016 | Krajec |
| 9,437,024 B2 | 9/2016 | Krajec |
| 2001/0034859 A1 | 10/2001 | Swoboda |
| 2002/0007297 A1 | 1/2002 | Clarke |
| 2002/0073063 A1 | 6/2002 | Faraj |
| 2002/0085041 A1 | 7/2002 | Ishikawa |
| 2002/0087949 A1 | 7/2002 | Golender |
| 2002/0138788 A1 | 9/2002 | Yenne et al. |
| 2002/0156724 A1 | 10/2002 | Levchin et al. |
| 2002/0157086 A1 | 10/2002 | Lewis et al. |
| 2002/0163498 A1 | 11/2002 | Chang et al. |
| 2002/0178185 A1 | 11/2002 | Kuchinsky et al. |
| 2002/0196229 A1 | 12/2002 | Chen et al. |
| 2002/0199172 A1 | 12/2002 | Bunnell |
| 2003/0037248 A1 | 2/2003 | Launchbury et al. |
| 2003/0061574 A1 | 3/2003 | Saluja et al. |
| 2003/0067481 A1 | 4/2003 | Chedgey et al. |
| 2003/0088854 A1 | 5/2003 | Wygodny et al. |
| 2003/0106046 A1 | 6/2003 | Arnold |
| 2003/0131286 A1 | 7/2003 | Kaler et al. |
| 2003/0140280 A1 | 7/2003 | Kaler et al. |
| 2004/0012638 A1 | 1/2004 | Donnelli et al. |
| 2004/0015929 A1 | 1/2004 | Lewis et al. |
| 2004/0073529 A1 | 4/2004 | Stanfill |
| 2004/0083425 A1 | 4/2004 | Dorwart |
| 2004/0117172 A1 | 6/2004 | Shibata |
| 2004/0117768 A1 | 6/2004 | Chang et al. |
| 2004/0128093 A1 | 7/2004 | Cragun et al. |

(56) References Cited

U.S. PATENT DOCUMENTS

| | | |
|---|---|---|
| 2004/0154016 A1 | 8/2004 | Randall |
| 2004/0181554 A1 | 9/2004 | Heckerman et al. |
| 2004/0205302 A1 | 10/2004 | Cantrill |
| 2005/0021318 A1 | 1/2005 | Inoue et al. |
| 2005/0102636 A1 | 5/2005 | McKeon |
| 2005/0120333 A1 | 6/2005 | Inoue et al. |
| 2005/0177820 A1 | 8/2005 | Mei et al. |
| 2005/0180330 A1 | 8/2005 | Shapiro |
| 2005/0188272 A1 | 8/2005 | Bodorin et al. |
| 2005/0204344 A1 | 9/2005 | Shinomi |
| 2005/0262470 A1 | 11/2005 | Gavrilov |
| 2005/0278208 A1 | 12/2005 | Schultz |
| 2006/0015612 A1 | 1/2006 | Shimazaki et al. |
| 2006/0015850 A1 | 1/2006 | Poole |
| 2006/0075390 A1 | 4/2006 | McAllister |
| 2006/0106843 A1 | 5/2006 | Middlefart et al. |
| 2006/0130016 A1 | 6/2006 | Wagner |
| 2006/0182133 A1 | 8/2006 | Choumaru |
| 2006/0212852 A1 | 9/2006 | Hwang |
| 2006/0242627 A1 | 10/2006 | Wygodny et al. |
| 2006/0248177 A1 | 11/2006 | Dostert et al. |
| 2006/0265397 A1 | 11/2006 | Bryan et al. |
| 2007/0022000 A1 | 1/2007 | Bodart et al. |
| 2007/0028189 A1 | 2/2007 | Robbins |
| 2007/0050174 A1 | 3/2007 | Dewitt et al. |
| 2007/0060205 A1 | 3/2007 | Kim |
| 2007/0118538 A1 | 5/2007 | Ahern et al. |
| 2007/0118909 A1 | 5/2007 | Hertzog |
| 2007/0140131 A1 | 6/2007 | Malloy et al. |
| 2007/0143795 A1 | 6/2007 | Tran |
| 2007/0198952 A1 | 8/2007 | Pittenger |
| 2008/0049022 A1 | 2/2008 | Sherb et al. |
| 2008/0065668 A1 | 3/2008 | Spence et al. |
| 2008/0092121 A1 | 4/2008 | DeRose et al. |
| 2008/0104225 A1 | 5/2008 | Zhang |
| 2008/0104451 A1 | 5/2008 | Blanchard et al. |
| 2008/0104570 A1 | 5/2008 | Chedgey et al. |
| 2008/0120400 A1 | 5/2008 | Keller et al. |
| 2008/0126003 A1 | 5/2008 | Goldstein et al. |
| 2008/0127108 A1 | 5/2008 | Ivanov et al. |
| 2008/0127109 A1 | 5/2008 | Simeon |
| 2008/0127112 A1 | 5/2008 | Kettley et al. |
| 2008/0140985 A1 | 6/2008 | Kitamorn et al. |
| 2008/0155348 A1 | 6/2008 | Ivanov et al. |
| 2008/0155349 A1 | 6/2008 | Ivanov et al. |
| 2008/0163124 A1 | 7/2008 | Bonev et al. |
| 2008/0168472 A1 | 7/2008 | Wilson |
| 2008/0256233 A1 | 10/2008 | Hall |
| 2008/0256466 A1 | 10/2008 | Salvador et al. |
| 2008/0256518 A1 | 10/2008 | Aoshima et al. |
| 2008/0271038 A1 | 10/2008 | Rolia et al. |
| 2008/0282232 A1 | 11/2008 | Cong et al. |
| 2008/0313502 A1 | 12/2008 | Mcfadden et al. |
| 2009/0037407 A1 | 2/2009 | Yang et al. |
| 2009/0037873 A1 | 2/2009 | Ahadian et al. |
| 2009/0049428 A1 | 2/2009 | Cozmei |
| 2009/0089765 A1 | 4/2009 | Guo et al. |
| 2009/0113399 A1 | 4/2009 | Tzoref et al. |
| 2009/0150874 A1 | 6/2009 | Chung et al. |
| 2009/0157723 A1 | 6/2009 | De et al. |
| 2009/0271729 A1 | 10/2009 | Killoren |
| 2009/0276288 A1 | 11/2009 | Hlavac et al. |
| 2009/0307630 A1 | 12/2009 | Kawai et al. |
| 2009/0313525 A1 | 12/2009 | Savin et al. |
| 2009/0319996 A1 | 12/2009 | Shafi et al. |
| 2010/0005249 A1 | 1/2010 | Bates |
| 2010/0011341 A1 | 1/2010 | Baierl et al. |
| 2010/0042944 A1 | 2/2010 | Robinson et al. |
| 2010/0070505 A1 | 3/2010 | Kao et al. |
| 2010/0077388 A1 | 3/2010 | Kimura |
| 2010/0083178 A1 | 4/2010 | Zui et al. |
| 2010/0083185 A1 | 4/2010 | Sakai et al. |
| 2010/0088665 A1 | 4/2010 | Langworthy et al. |
| 2010/0134501 A1 | 6/2010 | Lowe |
| 2010/0138431 A1 | 6/2010 | Bator et al. |
| 2010/0153786 A1 | 6/2010 | Matsukawa |
| 2010/0167256 A1 | 7/2010 | Blash |
| 2010/0180245 A1 | 7/2010 | Rutten |
| 2010/0223581 A1 | 9/2010 | Manolescu et al. |
| 2010/0235771 A1 | 9/2010 | Gregg, III |
| 2010/0281468 A1 | 11/2010 | Pavlyshchik |
| 2010/0281488 A1 | 11/2010 | Krishnamurthy et al. |
| 2010/0295856 A1 | 11/2010 | Ferreira et al. |
| 2010/0333039 A1 | 12/2010 | Denkel |
| 2011/0004598 A1 | 1/2011 | Kikuchi |
| 2011/0066973 A1 | 3/2011 | Plom et al. |
| 2011/0072309 A1 | 3/2011 | Sakai et al. |
| 2011/0078487 A1 | 3/2011 | Nielsen et al. |
| 2011/0126286 A1 | 5/2011 | Nazarov |
| 2011/0153817 A1 | 6/2011 | Wright et al. |
| 2011/0154300 A1 | 6/2011 | Rao et al. |
| 2011/0191343 A1 | 8/2011 | Heaton |
| 2011/0209153 A1 | 8/2011 | Suzuki et al. |
| 2011/0249002 A1 | 10/2011 | Duplessis et al. |
| 2011/0289485 A1 | 11/2011 | Mejdrich et al. |
| 2011/0314343 A1 | 12/2011 | Hoke et al. |
| 2011/0314543 A1 | 12/2011 | Treit et al. |
| 2012/0023475 A1 | 1/2012 | Surazski et al. |
| 2012/0042212 A1 | 2/2012 | Laurenti |
| 2012/0042269 A1 | 2/2012 | Holman |
| 2012/0047421 A1 | 2/2012 | Holman |
| 2012/0079108 A1 | 3/2012 | Findeisen |
| 2012/0079456 A1 | 3/2012 | Kannan |
| 2012/0102029 A1 | 4/2012 | Larson et al. |
| 2012/0117438 A1 | 5/2012 | Shaffer et al. |
| 2012/0137240 A1 | 5/2012 | Krueger |
| 2012/0137273 A1 | 5/2012 | Meijler et al. |
| 2012/0159391 A1 | 6/2012 | Berry et al. |
| 2012/0204156 A1 | 8/2012 | Kettley et al. |
| 2012/0221314 A1 | 8/2012 | Bourlatchkov et al. |
| 2012/0222019 A1 | 8/2012 | Gounares et al. |
| 2012/0222043 A1 | 8/2012 | Gounares et al. |
| 2012/0227040 A1 | 9/2012 | Gounares et al. |
| 2012/0233592 A1 | 9/2012 | Gounares et al. |
| 2012/0233601 A1 | 9/2012 | Gounares et al. |
| 2012/0260135 A1 | 10/2012 | Beck et al. |
| 2012/0290672 A1 | 11/2012 | Robinson et al. |
| 2012/0296991 A1 | 11/2012 | Spivack et al. |
| 2012/0317371 A1 | 12/2012 | Gounares et al. |
| 2012/0317389 A1 | 12/2012 | Gounares et al. |
| 2012/0317421 A1 | 12/2012 | Gounares et al. |
| 2012/0317557 A1 | 12/2012 | Garrett et al. |
| 2012/0317577 A1 | 12/2012 | Garrett et al. |
| 2012/0317587 A1 | 12/2012 | Garrett et al. |
| 2012/0323827 A1 | 12/2012 | Lakshmanan et al. |
| 2012/0324454 A1 | 12/2012 | Gounares et al. |
| 2012/0330700 A1 | 12/2012 | Garg et al. |
| 2013/0018925 A1 | 1/2013 | Pegg |
| 2013/0060372 A1 | 3/2013 | Lokowandt et al. |
| 2013/0061212 A1 | 3/2013 | Krause et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0104107 A1 | 4/2013 | De et al. |
| 2013/0117280 A1 | 5/2013 | Donaldson |
| 2013/0117753 A1 | 5/2013 | Gounares et al. |
| 2013/0117759 A1 | 5/2013 | Gounares et al. |
| 2013/0145350 A1 | 6/2013 | Marinescu |
| 2013/0159198 A1 | 6/2013 | Cartan |
| 2013/0187941 A1 | 7/2013 | Noon |
| 2013/0212479 A1 | 8/2013 | Willis |

(56) References Cited

U.S. PATENT DOCUMENTS

| | | | |
|---|---|---|---|
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0232433 A1 | 9/2013 | Krajec |
| 2013/0232452 A1 | 9/2013 | Krajec |
| 2013/0235040 A1 | 9/2013 | Jackson, Jr. |
| 2013/0271480 A1 | 10/2013 | Daynes |
| 2013/0282545 A1 | 10/2013 | Gounares et al. |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares et al. |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0291113 A1 | 10/2013 | Dewey |
| 2013/0298112 A1 | 11/2013 | Gounares et al. |
| 2014/0013306 A1 | 1/2014 | Gounares et al. |
| 2014/0013308 A1 | 1/2014 | Gounares et al. |
| 2014/0013311 A1 | 1/2014 | Garrett et al. |
| 2014/0019598 A1 | 1/2014 | Krajec et al. |
| 2014/0019756 A1 | 1/2014 | Krajec et al. |
| 2014/0019879 A1 | 1/2014 | Krajec |
| 2014/0019985 A1 | 1/2014 | Krajec et al. |
| 2014/0025572 A1 | 1/2014 | Krajec et al. |
| 2014/0026142 A1 | 1/2014 | Gounares et al. |
| 2014/0040591 A1 | 2/2014 | Gounares et al. |
| 2014/0053143 A1 | 2/2014 | Conrod et al. |
| 2014/0136233 A1 | 5/2014 | Atkinson et al. |
| 2014/0189650 A1 | 7/2014 | Gounares |
| 2014/0189651 A1 | 7/2014 | Gounares |
| 2014/0189652 A1 | 7/2014 | Gounares |
| 2014/0215444 A1 | 7/2014 | Voccio et al. |
| 2014/0278539 A1 | 9/2014 | Edwards |
| 2014/0317454 A1 | 10/2014 | Gataullin et al. |
| 2014/0317603 A1 | 10/2014 | Gataullin et al. |
| 2014/0317604 A1 | 10/2014 | Gataullin et al. |
| 2014/0317606 A1 | 10/2014 | Gataullin et al. |
| 2014/0359126 A1 | 12/2014 | Breternitz |
| 2014/0365544 A1 | 12/2014 | Moffitt |
| 2014/0365545 A1 | 12/2014 | Moffitt |
| 2015/0033172 A1 | 1/2015 | Krajec |
| 2015/0212928 A1 | 7/2015 | Gounares |
| 2015/0347277 A1 | 12/2015 | Gataullin et al. |
| 2015/0347283 A1 | 12/2015 | Gataullin et al. |
| 2015/0347628 A1 | 12/2015 | Krajec |
| 2016/0035115 A1 | 2/2016 | Krajec |
| 2016/0196201 A1 | 7/2016 | Seto et al. |

FOREIGN PATENT DOCUMENTS

| | | | |
|---|---|---|---|
| CN | 102592079 | | 7/2012 |
| CN | 103154928 | | 6/2013 |
| CN | 105283851 | A | 1/2016 |
| EP | 610581 | | 8/1994 |
| EP | 2390790 | | 11/2011 |
| WO | 0007100 | | 2/2000 |
| WO | 2010039893 | | 4/2010 |
| WO | 2011116988 | | 9/2011 |
| WO | 2011142720 | | 11/2011 |
| WO | 2011146750 | | 11/2011 |
| WO | 2012106571 | | 8/2012 |
| WO | 2014120263 | | 8/2014 |

OTHER PUBLICATIONS

International Search Authority, "International Search Report and Written Opinion", Korea Intellectual Property Office, PCT/US2014/011733, dated May 8, 2014, 10062-02.

Aguilera, et al., "Performance Debugging for Distributed Systems of Black Boxes", ACM, 2003, pp. 74-89.

Hsu, et al., "Visibility Enhancement for Silicon Debug", ACM, 2006, pp. 13-18.

Ungar, et al., "Self", ACM, 2007, pp. 1-50.

Kaya, et al., "Error Pattern Analysis of Augmented Array Codes Using a Visual Debugging Tool", IEEE, 2006, pp. 1-6.

LabVIEW, "Debugging Techniques", Jun. 2011, 7 pages. Available at <<http://zone.ni.com/reference/en-XX/help/371361H-01/1vconcepts/debug_techniques/>>.

Kumar, et al., "Visualization of Clustered Directed Acyclic Graphs with Node Interleaving", ACM, pp. 1800-1805, Mar. 2009.

Natour, "On the Control Dependence in the Program Dependence Graph", ACM, pp. 510-519, 1988. (The month of Publication is irrelevant since the year of Publication is clearly prior to the filing of the Application).

Ioannidis et al., "Transitive Closure Algorithms Based on Graph Traversal", ACM Transactions on Database sSystems, vol. 18, No. 3, pp. 512-579, Sep. 1993.

Fu, et al., "De-anonymizing Social Graphs via Node Similarity", ACM, pp. 263-264, Apr. 2014.

Supplementary Search Report Issued in European Patent Application No. 13873476.9, dated Aug. 2, 2016, 10 pages.

Barbosa et al. "Interactive SNMP Traffic Analysis Through Information Visualization" In Proceedings of the IEEE Network Operations and Management Symposium (NOMS), Apr. 19, 2010, pp. 73-79.

Dobrev et al. "Visualization of Node Interaction Dynamics in Network Traces" In Proceedings of the 3rd International Conference on Autonomous Infrastructure, Management and Security, AIMS 2009, Enschede, Jun. 30, 2009, pp. 147-160.

Joyce et al. "Monitoring Distributed Systems" In Journal of ACM Transactions on Computer Systems (TOCS), vol. 5, Issue 2, May 1, 1987, pp. 121-150.

International Search Report and Written Opinion for PCT/US2013/043492 dated Nov. 6, 2013, 11 pages.

International Search Report and Written Opinion for PCT/US2013/073894 dated Apr. 1, 2014.

International Search Report and Written Opinion for PCT/US2013/044193 dated Oct. 29, 2013.

International Search Report and Written Opinion for PCT/US2013/046050 dated Nov. 8, 2013.

International Search Report and Written Opinion for PCT/US2013/046922 dated Dec. 17, 2013.

International Search Report and Written Opinion for PCT/US2013/043522 dated Nov. 6, 2013.

Gephi Tutorial Layouts, Gephi, Jun. 13, 2011.

International Search Report and Written Opinion for PCT/US2013/046664 dated Nov. 20, 2013.

International Search Report and Written Opinion for PCT/US2013/047211 dated Nov. 27, 2013.

International Search Report and Written Opinion for PCT/US2013/046925 dated Nov. 25, 2013.

International Search Report and Written Opinion for PCT/US2013/046918 dated Nov. 25, 2013.

International Search Report and Written Opinion for PCT/US2013/043811 dated Nov. 28, 2013.

"Method and System for Automatically Tracking User Interactions and Providing Tags to the User Interactions" An IP.com Prior Art Database Technical Disclosure, Dec. 4, 2010.

International Search Report and Written Opinion for PCT/US2014/011727 dated May 16, 2014.

Grossbart "Javascript Profiling with the Chrome Developer Tools" Smashing Magazine Website, Jun. 12, 2012.

Cantrill "Instrumenting the Real-Time Web: Node.js in Production" Node Summit 2012 Presentation; Jan. 24-25, 2012.

Whitehead "Java Run-Time Monitoring, Part 2: Postcompilation Instrumentation and Performance Monitoring—Interception, Class Wrapping, and Bytecode Instrumentation" IBM.com Website Aug. 5, 2008.

Kinsey "Under the Hood: The JavaScript SDK—Error Handling" Facebook.com website Nov. 1, 2012.

"Automagically Wrapping JavaScript Callback Functions" tlrobinson.net.blog, Oct. 22, 2008.

(56) References Cited

OTHER PUBLICATIONS

International Search Report and Written Opinion for PCT/IB2014/060233 dated Nov. 11, 2014.
Heer et al. "Prefuse" CHI 2005, Conference Proceedings, Conference on Human Factors in Computing Systems; Apr. 2, 2005, pp. 421-430.
European Search Report for EP 13873299 dated Sep. 21, 2016.
U.S. Appl. No. 13/757,598, Jul. 17, 2014, Office Action.
U.S. Appl. No. 13/899,504, Jul. 21, 2014, Office Action.
U.S. Appl. No. 13/757,625, Aug. 13, 2014, Office Action.
U.S. Appl. No. 13/899,507, Sep. 11, 2014, Office Action.
U.S. Appl. No. 13/899,503, Sep. 12, 2014, Office Action.
U.S. Appl. No. 13/757,570, Nov. 14, 2014, Office Action.
U.S. Appl. No. 13/757,625, Jan. 2, 2015, Office Action.
U.S. Appl. No. 13/899,507, Jul. 1, 2015, Office Action.
U.S. Appl. No. 13/757,598, Feb. 13, 2015, Office Action.
U.S. Appl. No. 13/899,503, Mar. 11, 2015, Office Action.
U.S. Appl. No. 13/899,504, Mar. 11, 2015, Office Action.
U.S. Appl. No. 13/757,570, Jul. 29, 2015, Office Action.
U.S. Appl. No. 13/899,503, Nov. 3, 2013, Office Action.
U.S. Appl. No. 13/899,504, Nov. 6, 2015, Office Action.
U.S. Appl. No. 14/666,120, May 24, 2016, Office Action.
U.S. Appl. No. 13/899,504, May 26, 2016, Office Action.
U.S. Appl. No. 13/899,503, Jun. 2, 2016, Office Action.
U.S. Appl. No. 13/949,994, Aug. 26, 2016, Office Action.
U.S. Appl. No. 13/899,503, Oct. 5, 2016, Office Action.
Extended Search Report Issued in European Patent Application No. 14843127.3, dated Apr. 13, 2017, 9 Pages.
First Office Action and Search Report Issued in Chinese Patent Application No. 201380075253.9, dated Apr. 5, 2017, 27 Pages.
U.S. Appl. No. 13/949,994, May 19, 2017, Office Action.
U.S. Appl. No. 13/757,570, May 19, 2017, Office Action.
Notice of Allowance dated Sep. 6, 2017 cited in U.S. Appl. No. 15/068,996 (Copy Attached).
European Search Report for EP 14801342 dated Dec. 6, 2016.
Vetter et al. "Real-Time Performance Monitoring, Adaptive Control, and Interactive Steering of Computational Grids", International Journal of High Performance Computing Applications, vol. 14, No. 4, 2000, pp. 357-366.
Notice of Allowance dated May 5, 2017 cited in U.S. Appl. No. 14/883,554 (Copy Attached).
"Second Office Action Issued in Chinese Patent Application No. 201480062297.2", dated Jul. 17, 2018, 19 Pages.
Office Action dated Dec. 30, 2016 cited in U.S. Appl. No. 13/899,504 (Copy Attached).
Notice of Allowance dated Jan. 20, 2017 cited in U.S. Appl. No. 14/666,120 (Copy Attached).
Huang et al. "Force-Transfer: A New Approach to Removing Overlapping Nodes in Graph Layout", ACM, pp. 1-10, 2003.
Nusayr et al. "Using AOP for Detailed Runtime Monitoring Instrumentation", ACM, pp. 8-14, 2009.
Reiss, "Visualization Program Execution Using User Abstractions", ACM, pp. 125-134, 2006.
"Search Report Issued in European Patent Application No. 14863024.7", dated Aug. 28, 2017, 13 Pages.
Office Action dated Nov. 17, 2016 cited in U.S. Appl. No. 13/757,570 (Copy Attached).
First Office Action Issued in Chinese Patent Application No. 201480052771.3, dated Nov. 3, 2017 (Copy Attached).
First Office Action issued in Chinese Patent Application No. 201480062297.2, dated Nov. 27, 2017 (Copy Attached).
"Second Office Action Issued in Chinese Patent Application No. 201380075253.9", dated Oct. 20, 2017, 15 Pages.
Office Action issued in Chinese Patent U.S. Appl. No. 201480029533.0 dated Mar. 20, 2017.
Notice of Allowance dated Apr. 5, 2017 cited in U.S. Appl. No. 13/899,504 (Copy Attached).
Supplementary European Search Report issued in EPO Application No. 14801342.8 dated Apr. 10, 2017.
Bita Mazloom et al: "Dataflow Tomography", ACM Transactions on Architecture and Code Optimization, vol. 9, No. 1, Mar. 2012, pp. 1-26.
Lienhard A et al: "Taking an object-centric view on dynamic information with object flow analysis", Computer Languages. Systems & Structures, Pergamon, Amsterdam, NL, vol. 25, No. 1, Apr. 2009, pp. 63-79.
Extended European Search Report issued in EPO Patent Application No. 14829908.4 dated Apr. 11, 2017.
"Non-Final Office Action Issued in U.S Appl. No. 14/883,554", dated Feb. 22, 2017, 14 Pages.
Office Action issued in Chinese Patent Application No. 201380075229.5 dated Mar. 1, 2017.
"Third Office Action Issued in Chinese Patent Application No. 201480062297.2", dated Feb. 2, 2019, 20 Pages.

* cited by examiner

SOFTWARE COMPONENT RECOMMENDATION BASED ON MULTIPLE TRACE RUNS

CROSS REFERENCE TO RELATED APPLICATIONS

This application claims priority to and benefit of U.S. Patent Application Ser. No. 61/903,755 entitled "Software Component Recommendation Based on Multiple Trace Runs" filed 13 Nov. 2013, U.S. Patent Application Ser. No. 61/903,762 entitled "Relationship Graph for Software Component Recommendations" filed 13 Nov. 2013, and U.S. Patent Application Ser. No. 61/903,768 entitled "Component Usage Recommendation System with Relationship and Performance Matching" filed 13 Nov. 2013, all of which are hereby expressly incorporated by reference for all they disclose and teach.

BACKGROUND

Many computer programming languages have a vast trove of reusable software components, many of which may be open source. These components can range in quality from very poor to excellent, with an equal range of performance characteristics. In many languages, there may be hundreds of thousands or even millions of different components. This poses a difficult issue for a developer: how does one select a component from a vast library?

SUMMARY

Recommendations may be generated while calculating performance metrics from multiple uses of a software component. A tracing service may collect trace data from multiple uses of a software component, where each use may be done on different conditions. The performance metric analysis may identify various factors that may affect the performance of a software component, then present those factors to a user in different delivery mechanisms. In one such mechanism, a recommended set of hardware and software configurations may be generated as part of an operational analysis of a software component.

A recommendation system may identify compatible and incompatible software components, as well as other recommendations, by analyzing a graph of module usage across multiple applications that may use various modules. The graph may identify a module relationship that may be classified as a 'hard' relationship defined by being called or incorporated in another module, as well as 'soft' relationships that may be identified by being incorporated into an application with another module. The graph may further identify potentially mutually exclusive modules that may be identified when a module is removed and replaced with a second module. The graph may be used to recommend related modules or sets of modules for a give use case, among other uses.

A usage recommendation system may suggest hardware and software configurations as well as other compatible or useful modules based on information provided by a user. While architecting a software application or browsing modules, a user may be presented with modules that may be compatible in terms of their performance on similar hardware platforms or under similar loads, as well as by their compatibility based on relationships in a graph of module relationships that may be gathered from analyzing many different uses of various modules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
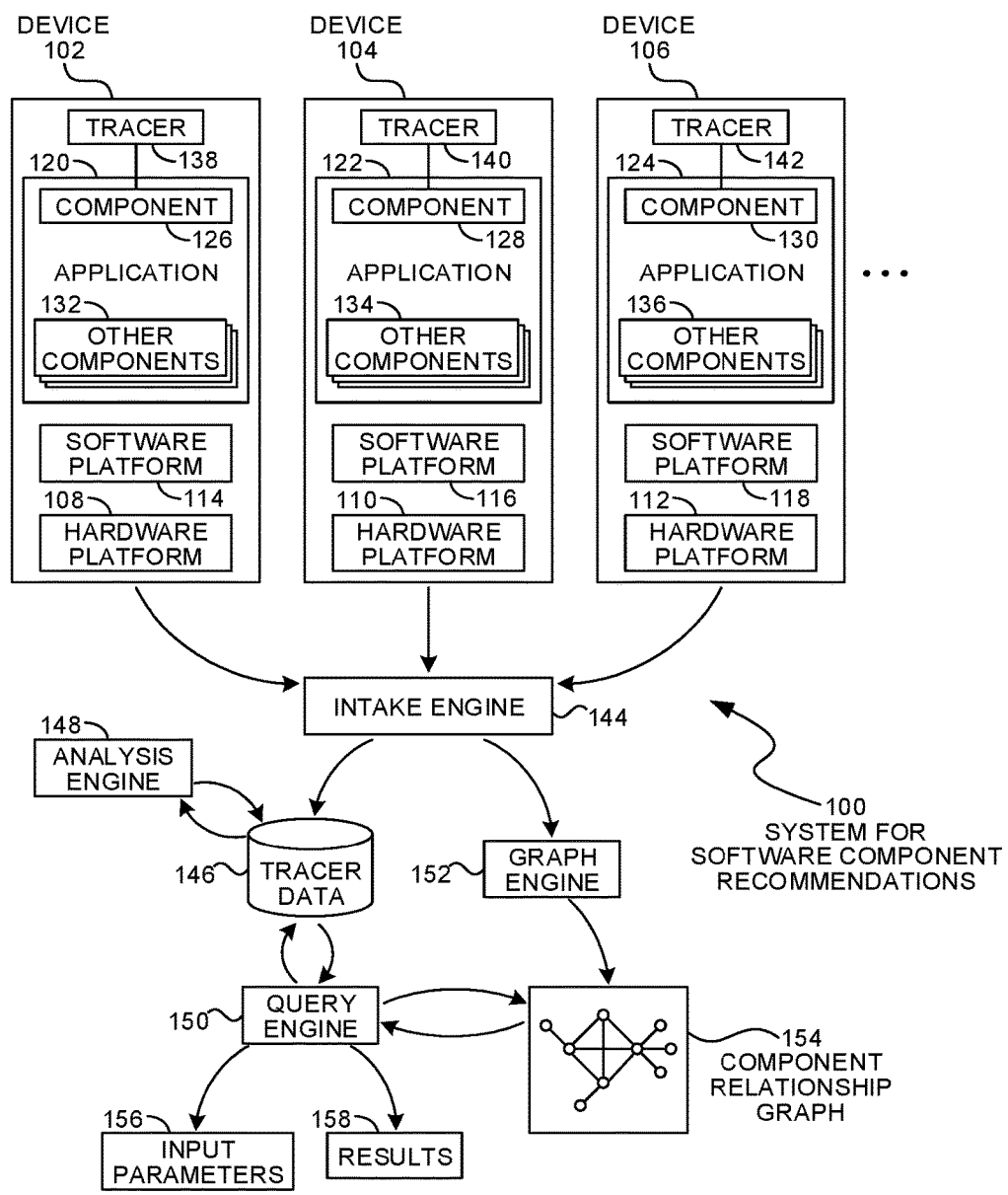
FIG. 1 is a diagram illustration of an embodiment showing a system for software component recommendations.

Module Recommendation System Based on Multiple Trace Runs

A module recommendation system may analyze trace runs from multiple uses of a software component. The analysis may identify factors under which the software component performs well or poorly, and these factors may be used in a recommendation system for software components. The factors may include hardware and software configurations, input parameters, general usage parameters, and other factors.

The factors may be generated by comparing different trace datasets to each other and determining the dominant factors that help define the differences between the trace datasets. The dominant factors may help identify the conditions that may be favorable or unfavorable for the operation of various software components. These conditions may be used in several different manners to recommend software components and conditions for executing software components.

The trace datasets may be any type of data that may be collected while an application executes. In many cases, the trace datasets may be time series sequences of trace data that may include performance and operational information about the application. Such sequences may represent how an application and its various components may perform during execution and under load. In many cases, the trace datasets may include information about the load experienced by the application, and in some cases, load or other information may be inferred from analysis of the trace data or other data.

The factors contributing to a software component's favorable or unfavorable operation may be presented to a user as part of a software component statistics user interface. A software component statistics listing may identify which factors are dominant in the fully utilizing the software component, as well as the factors to avoid when deploying the software component. Such information may be helpful for a developer who may be searching for a software component to perform a certain function.

The factors may be implemented as a predictive model for a component's behavior. Such a predictive model may include the dominant factors that may affect a performance or other metric for the component. In a simple example, a predictive model may estimate a component's response time for handling a request given a set of hardware, software, and usage parameters that the component may experience.

Relationship Graph for Software Component Recommendations

A relationship graph for software components may identify different types of relationships between reusable software components. A 'hard' relationship may exist where one component calls or includes a second component, while a 'soft' relationship may exist where a developer uses two components in the same application. In some cases, a mutually exclusive relationship may be identified when one component is replaced by another in new revisions of an application.

The relationship graph may be created by many different data sources. In some cases, analyses may be performed from data in a repository containing many different applications or components. By analyzing applications, relationships between commonly used components may be identified. In some cases, an analysis of different versions of applications may identify situations where one component may be removed and another one added, thereby indicating a possible mutually exclusive relationship.

The relationship graph may be gathered in part from analyzing tracer data from multiple applications. The tracer data may include performance and operational data for components used within an application, and both 'hard' and 'soft' relationships may be identified. In some cases, a relationship graph may be generated from multiple sources, include data from multiple repositories as well as tracer data gathered by tracing multiple applications.

The relationships between modules may be used in many different manners. In one example, a component statistics display may include links to other components for which various relationships are known.

Component Usage Recommendation System with Relationship and Performance Matching A component usage recommendation system may use both performance matching and component relationships to recommend various components or identify components for replacement. For various components, a set of influencing factors may be identified that increase or decrease a component's effectiveness when executed. Further, relationships between components may be identified through a relationship graph. The influencing factors and relationships may be used in several different scenarios to evaluate components and assist users.

In one use scenarios, an analysis may be performed of an application in its intended execution environment and anticipated execution conditions. The analysis may result in a suitability rating or other metric in some cases. Some systems may identify certain components that may be unsuitable for a specific execution environment or conditions, and may further recommend different components for the application.

In another use scenario, a user may define a set of deployment conditions, including hardware, software, loads, and other parameters. From the given conditions, components may be searched, sorted, ranked, or otherwise recommended that may match the intended deployment conditions.

Throughout this specification and claims, the term "component" is used to define a group of reusable code that may be incorporated into an application. A component may be known as a 'module', 'library', 'subroutine', or some other notion. For the purposes of this specification and claims, these terms are considered synonymous.

The "component" may be code that is arranged in a way that multiple applications may access the code, even though the applications may have no connection with each other. In general, a "component" may be code that is configured to be reused. In some cases, a component may be reused within the scope of a large application, while in other cases, the component may be shared to other application developers who may use the component in disparate and unconnected applications.

Many programming languages and paradigms have a notion of a "component" or library, where the component may have a defined interface through which an application may invoke and use the component. Some paradigms may allow a programmer to incorporate a component in a static manner, such that the component code does not further change after the application is written and deployed. Some paradigms may allow for dynamic libraries, which may be loaded and invoked at runtime or even after execution has begun. The dynamic libraries may be updated and changed after the application may have been distributed, yet the manner of invoking the libraries or components may remain the same.

Components may be distributed in source code, intermediate code, executable code, or in some other form. In some cases, components may be services that may be invoked through an application programming interface.

Throughout this specification and claims, the term "component" may be applied to a single reusable function. Such a function may be distributed as part of a library, module, or other set of code, and may reflect the smallest element of reusable code that may be distributed. A single "component" as referenced in this specification and claims may be an individual application programming interface call or callable subroutine or function, as well as a module, library, or other aggregation of multiple callable functions, application programming interface calls, or other smaller elements.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced. The collected data may also include cache misses, garbage collection operations, memory allocation calls, page misses, and other parameters.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration of an embodiment 100 showing a system for providing recommendations for software components. The recommendations may use performance data and/or a component relationship graph to identify and suggest different components that may meet an anticipated usage and architecture for an application.

The recommendation system may use data that may be collected from multiple instances of a software component. The software component may be a module, library, subroutine, or other component that may be used in many instances of the same application or in many different applications. When data from multiple instances are analyzed, those factors that cause the component to behave in certain ways may be identified. The causal factors may be very useful to developers when selecting components that may operate optimally in the anticipated deployment conditions.

In the example of embodiment 100, a software component may be called within three different applications and executed under three different conditions. Different hardware components may be used, as well as different software platforms. The software platforms may include operating systems, execution environments, drivers, other applications, or any other software variable.

Tracer data may be collected when executing the application under the various conditions. A comparative analysis of the different tracer datasets may reveal which environmental and deployment factors are the dominant factors in affecting performance or other desired metrics. In a simple example, such an analysis may reveal that a certain component may operate very effectively when deployed on a single processor, but performance suffers when deployed on many processors. In another example, a component may be determined to operate optimally under certain types of loads but not under other loads.

A graph of relationships between components may be generated from tracer data as well as other sources. The graph may identify components that have express, implied, mutually exclusive, and other types of relationships.

An express relationship may be identified when one component calls another component. In such a situation, the first component includes the second component. While the second component may be used separately from the first, the first cannot be used without the second.

An implied relationship may be identified when two components may be used in the same application but without calling each other. Such a situation may occur when an application developer selects both components and uses both in the same application. An implied relationship may indicate that two components are complementary to each other. When making recommendations to a developer, an implied relationship may help identify components that the developer may be likely to consider when building an application.

A mutually exclusive relationship may indicate that one component may replace another. Such components may rarely be used in the same application, and may be identified when an application developer removes one component and replaces the component with another component. Such a situation may be observed by analyzing different versions of an application, tracking when a component is removed and when another component is added. While such an analysis may be not be conclusive that a mutually exclusive relationship exists, such an analysis may be one indicator that such a relationship may be present.

A mutually exclusive relationship between components may be useful to recommend components that may be candidates to replace a current set of components in an application. A recommendation system may use a mutually exclusive relationship to suggest changes to an application. When coupled with performance data analyses, such a recommendation may have performance or other data to support such a change.

The devices 102, 104, and 106 illustrate three different deployments of a software component. The devices may operate on three different hardware platforms 108, 110, and 112 and may have three different software platforms 114, 116, and 118, respectively. The hardware platforms may have different processor speed, number of processors, memory, storage, network interface, peripherals, or other parameters. Similarly, the software platforms may have different operating systems, execution environments, drivers, applications, or other software variations.

The applications 120, 122, and 124 may be different applications in some cases. The applications may be different versions of the same application, or completely different applications that may have different architectures, input streams, and different functions.

The components 126, 128, and 130 may be the component of interest in the example of embodiment 100, meaning that the components 126, 128, and 130 may be analyzed to determine the differentiating factors that affect the performance or other output of the component.

The different applications may use the components 126, 128, and 130 in different manners. Some of the applications may exercise some functions of the component while other applications may exercise other functions. Each of the various applications may have different input streams that may be processed by the components, and may exercise the components under different loads.

Additional components 132, 134, and 136 may be present in the applications 120, 122, and 126, respectively. The additional components may be selected by a developer to perform additional functions within the various applications, and the presence of these additional components may be used to establish relationships between various components.

Each of the components 126, 128, and 130 may have a tracer 138, 140, and 142, respectively, that may gather performance and other data, then transmit tracer data to an intake engine 144. In the example of embodiment 100, the tracers 138, 140, and 142 are shown as connecting to the components 126, 128, and 130, respectively. Such an illustration may show that the tracer may monitor only the component to which it is attached. Other embodiments may have a tracer that may gather trace data for an entire application or for multiple components within an application.

The intake engine 144 may receive tracer data from various devices. The tracer data may be stored in a tracer database 146, which may store tracer data from many different applications and software components. An analysis engine 148 may process the trace datasets to determine which of the many factors are dominant to affect the performance or other metric for a given component or application.

The trace data received by the intake engine 144 may also be processed by a graph engine 152 to create a component relationship graph 154. The component relationship graph 154 may contain express and implied relationships between various components. Such relationships may be generated from trace data as well as from other sources, such as various repositories.

A query engine 150 may receive requests containing input parameters 156 and return results 158. In one example of a query, a request may contain input parameters 156 that may define an anticipated execution scenario for an application, including usage and architecture information. These parameters may be used by the query engine 150 to generate a list of software components with performance data as options for a developer to consider.

Figure 2:
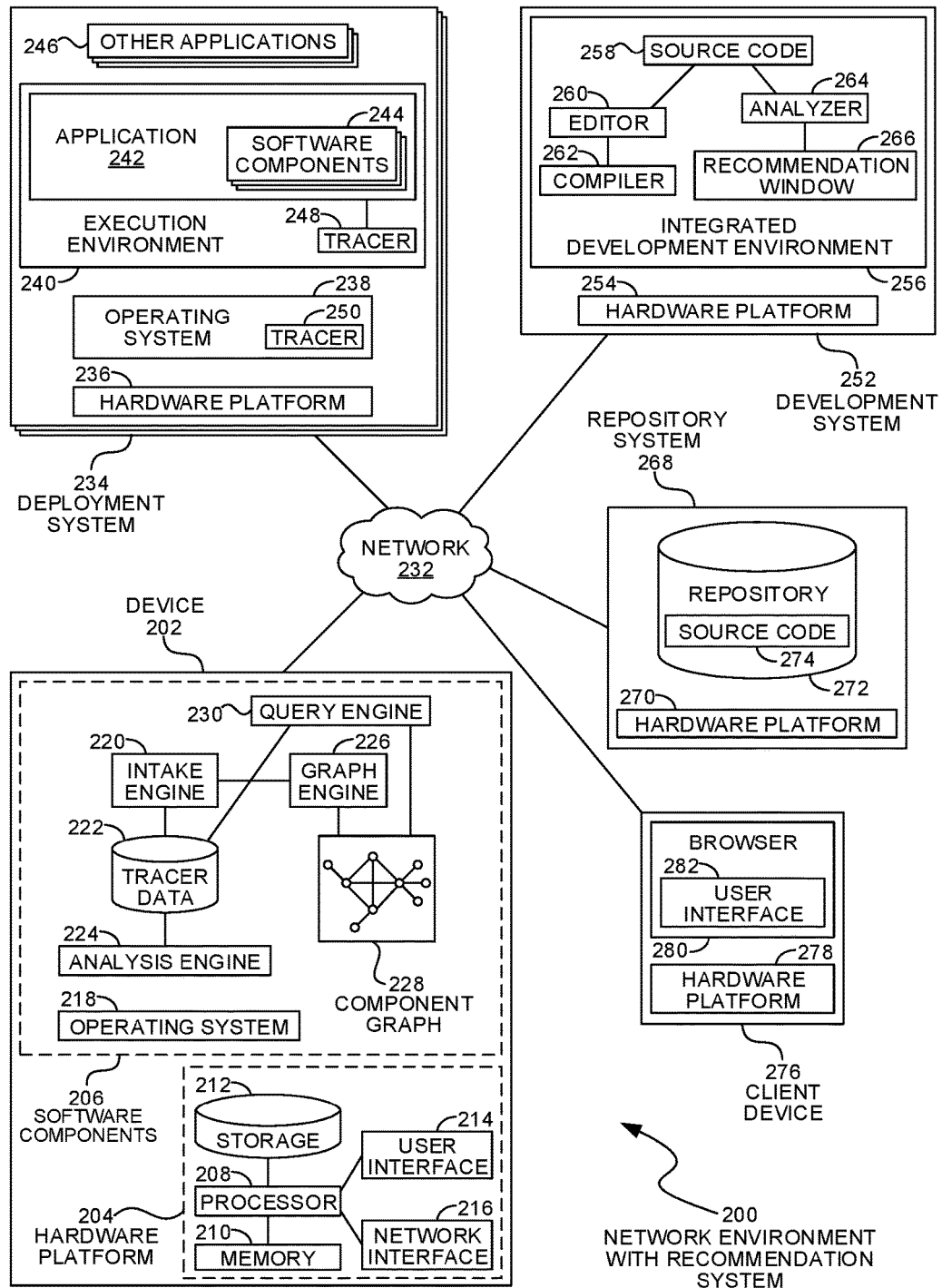
FIG. 2 is a diagram illustration of an embodiment showing a network environment with devices that may generate component recommendations.

FIG. 2 is a diagram of an embodiment 200 showing components that may collect data when an application executes and analyzes the data to identify recommendations or other uses. The example of embodiment 200 may illustrate one architecture where tracer data may be collected from multiple devices, then analyzed in a tracer database. A component graph may be generated from relationships identified from the tracer data or other sources.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. An intake engine 220 may receive tracer data from tracers on other devices and may store the tracer data into a tracer database 222. An analysis engine 224 may identify various differentiating factors that may affect the performance of the software components that were traced.

A graph engine 226 may identify relationships between software components and build a component graph 228. The graph engine 226 may use trace data, as well as data from other sources, including component repositories, application repositories, and other sources to identify relationships between the components.

A query engine 230 may respond to requests that may use either or both of the tracer database 222 and the component graph 228 to generate results to a query.

A network 232 may connect the various devices that may interact in embodiment 200.

Deployment systems 234 may execute applications and gather tracer data while the applications execute. In many cases, the deployment systems 234 may be production systems on which an application may execute. The deployment systems 234 may operate on various hardware platforms 236, which may be similar to those described for the hardware platform 204.

An operating system 238 or execution environment 240 may execute an application 242. The application 242 may contain various software components 244, and various other applications 246 may also execute on the deployment systems 234. A tracer 248 may operate within the execution environment 240. In some cases, a tracer 250 may execute within the operating system 238.

A development system 252 may illustrate a device on which a developer may create and edit an application's source code 258. The development system 252 may operate on a hardware platform 254, which may be similar to those described for the hardware platform 204.

An integrated development environment 256 may be an application or suite of applications that includes various tools used by a developer, such as an editor 260 and a compiler 262.

An analyzer 264 may analyze the application's source code 258 to generate a query for the query engine 230. The query may define characteristics of an application under development, and the query engine 230 may return information that may be displayed in a recommendation window 266. Such information may include performance data for components in the source code 258, as well as alternate components that may be considered for the application under development.

A repository system 268 may be a system that contains repositories 272 for source code 274. The repositories 272 may contain application code, component code, or other software. The repository system 268 may execute on a hardware platform 254, which may be similar to those described for the hardware platform 204.

The repositories may be analyzed by a graph engine 226 to build the component graph 228. The repositories may indicate implied relationships where two components may frequently be used together, express relationships where one component calls another, and mutually exclusive relationships where components may be exchanged for each other.

A client device 276 may be one mechanism for displaying query results from the query engine 230. The client device 276 may have a hardware platform 278, which may be similar to those described for hardware platform 204. A browser 280 may execute on the client device 276 and display a user interface 282. The user interface 282 may be a web page or other interface through which some of the query results may be displayed.

Figure 3:
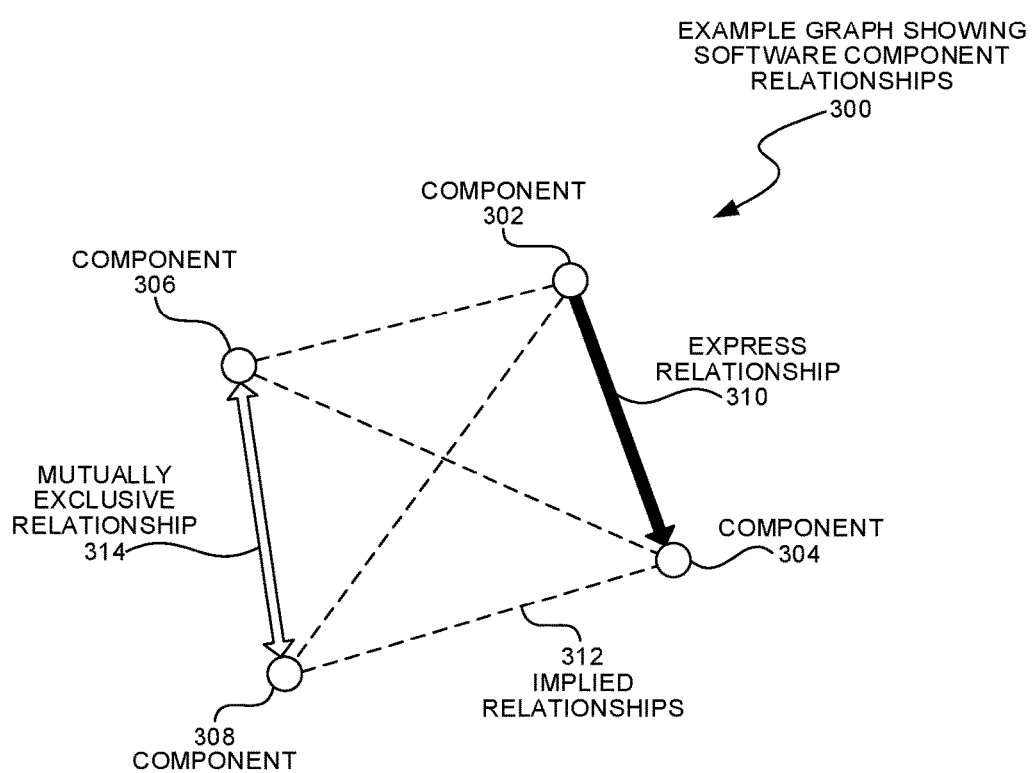
FIG. 3 is a diagram illustration of an embodiment showing an example component graph with relationships.

FIG. 3 is a diagram illustration of an example embodiment 300 showing a software component relationship graph. Embodiment 300 is a simple graph that illustrates components 302, 304, 306, and 308 along with various relationships.

The components may represent reusable software components that may be deployed on various applications. The components may have been discovered through tracer data, source code analysis, repository analysis, or other mechanisms, examples of which may be found later in this specification.

Components 302 and 304 are illustrated with an express relationship 310. The express relationship 310 may be directional, indicating that component 302 may be included or called from component 304. Such a relationship may be a hardcoded relationship, where the source code of component 304 may have called component 302.

Components 306 and 308 are illustrated with a mutually exclusive relationship 314. In a mutually exclusive relationship, two components may often be used in place of each other and rarely used together. Such relationships may be identified by analyzing changes made to an application over many versions. When one component is removed and another component added, such a situation may indicate a mutually exclusive relationship.

Components 302, 304, 306, and 308 may be joined by implied relationships 312. Implied relationships may be identified when two components may be used in the same application. Such relationships may indicate that two components are compatible with and complementary to each other.

A graph such as embodiment 300 may be used to recommend components. For example, an application may contain component 306, which may have implied relationships to components 302 and 304. During an analysis, components 302 and 304 may be recommended to a developer, as components 302 and 304 are commonly used with component 306. Additionally, component 308 may be recommended as a replacement to component 306 due to the mutually exclusive relationship.

Figure 4:
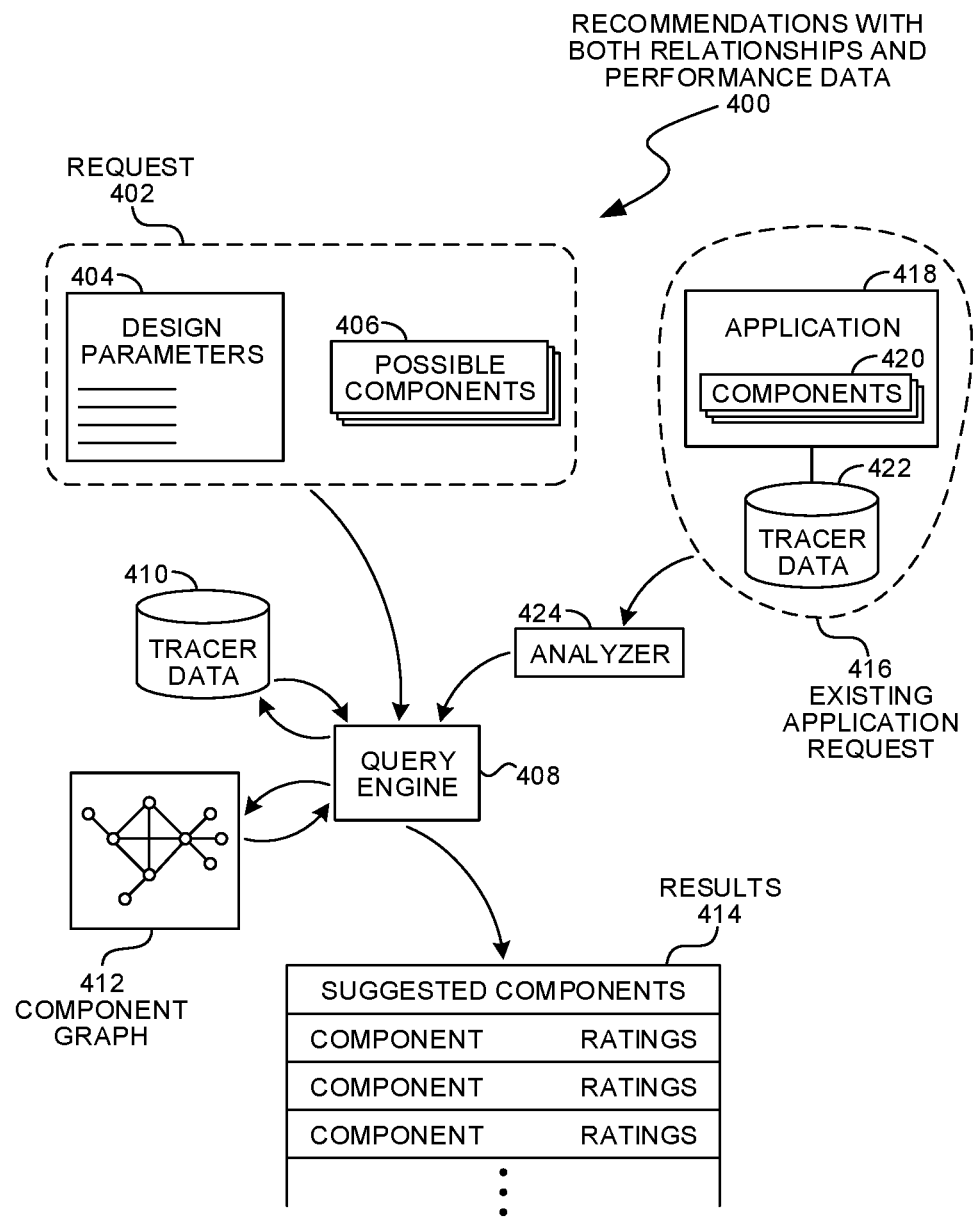
FIG. 4 is a diagram illustration of an embodiment showing recommendations with both relationships and performance data.

FIG. 4 is a diagram illustration of an embodiment 400 showing recommendations with both relationship and performance data.

Embodiment 400 illustrates a request 402 that may include design parameters 404 and possible components 406 for an application. The request 402 may be processed by a query engine 408 to generate some results 414. In another scenario, a request 416 may be generated from an existing application and trace data.

In both types of requests, the query engine 408 may receive information regarding the operational characteristics and deployment architecture. The operational characteristics may be a description of how a component may be used. Such a description may include the load, frequency of requests, input parameters, and other descriptions of intended use. The deployment architecture may define the hardware and software platforms on which the component may execute. Such descriptors may include processor speed, number of processors, memory, storage capacity, storage and network bandwidth, throughput and latency, and other parameters.

The possible components 406 may be a preliminary architecture for an application. Such information may be a starting point for traversing a component graph and providing architecture recommendations. In one use case, the possible components 406 may be components that may represent intended functionality of an application. In such a use case, the results 414 may be a set of components that may match the deployment architecture and intended operational characteristics. Such a use case may be helpful to identify software components at the beginning of a project that may be optimally suited for an intended deployment.

An existing application request 418 may analyze an application that may be in some state of deployment. In some cases, the application may be in development and executing on test or development hardware, while in other cases, the application may have been deployed on production hardware and executed under production loads. Such an application 418 may include several components 420.

A set of trace data 422 may be included in the request 416. The trace data 422 may be analyzed by the analyzer 424 to extract actual operational characteristics and deployment architecture information. Such an analysis may be useful when the trace data 422 may be gathered in a production environment. In cases where the trace data 422 may not accurately reflect an intended production environment and usage, a user may manually select such parameters.

The query engine 408 may analyze a request to generate results 414 that may include a list of suggested components and various performance metrics for the components. A component graph 412 may be queried to identify comparable or related components to those identified in a request. The list of components may be analyzed against a trace database 410 to determine performance and other parameters. Once the performance is known, the components may be ranked or sorted. Recommendations may be made by comparing a baseline set of components in the request to other components that may be identified from the component graph 412.

Figure 5:
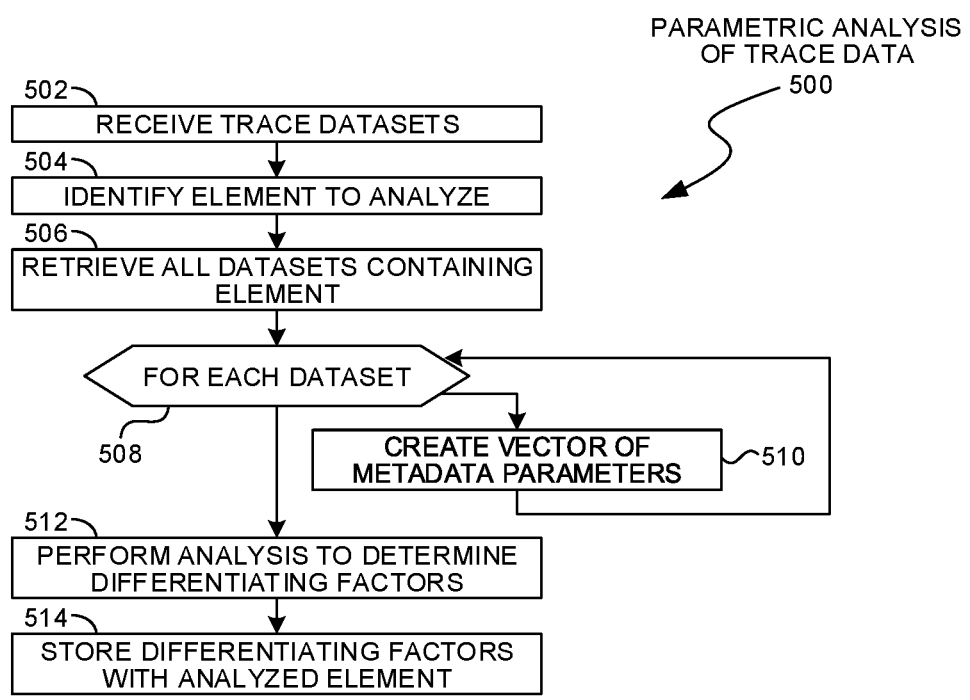
FIG. 5 is a flowchart illustration of an embodiment showing a method for parametric analysis of trace data.

FIG. 5 is a flowchart illustration of an embodiment 500 showing a method for parametric analysis of trace data. Embodiment 500 illustrates a simplified method for extracting differentiating factors from multiple trace datasets.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Trace datasets may be received in block 502. An element to be analyzed may be identified in block 504. The element to be analyzed may be a software component, for example.

All datasets containing the element may be retrieved in block 506. For each dataset in block 508, a vector may be created containing any available metadata elements in block 510. After creating vectors for each dataset, multivariate analysis may be performed in block 512 to determine the differentiating factors, which may be stored in block 514.

The differentiating factors may be those factors having the largest effect on performance or other metric. These factors may indicate conditions under which a given component may operate well and which conditions the same component may operate poorly. Such factors may be useful when comparing similar components. For example, when suggesting or recommending components for a given set of execution conditions, a sort may be performed on the differentiating factors to identify components that may operate well under the selected conditions.

The differentiating factors may be useful to developers who may be responsible for a selected component. The factors may indicate performance issues under certain conditions and give the developer some direction for improving a component.

Figure 6:
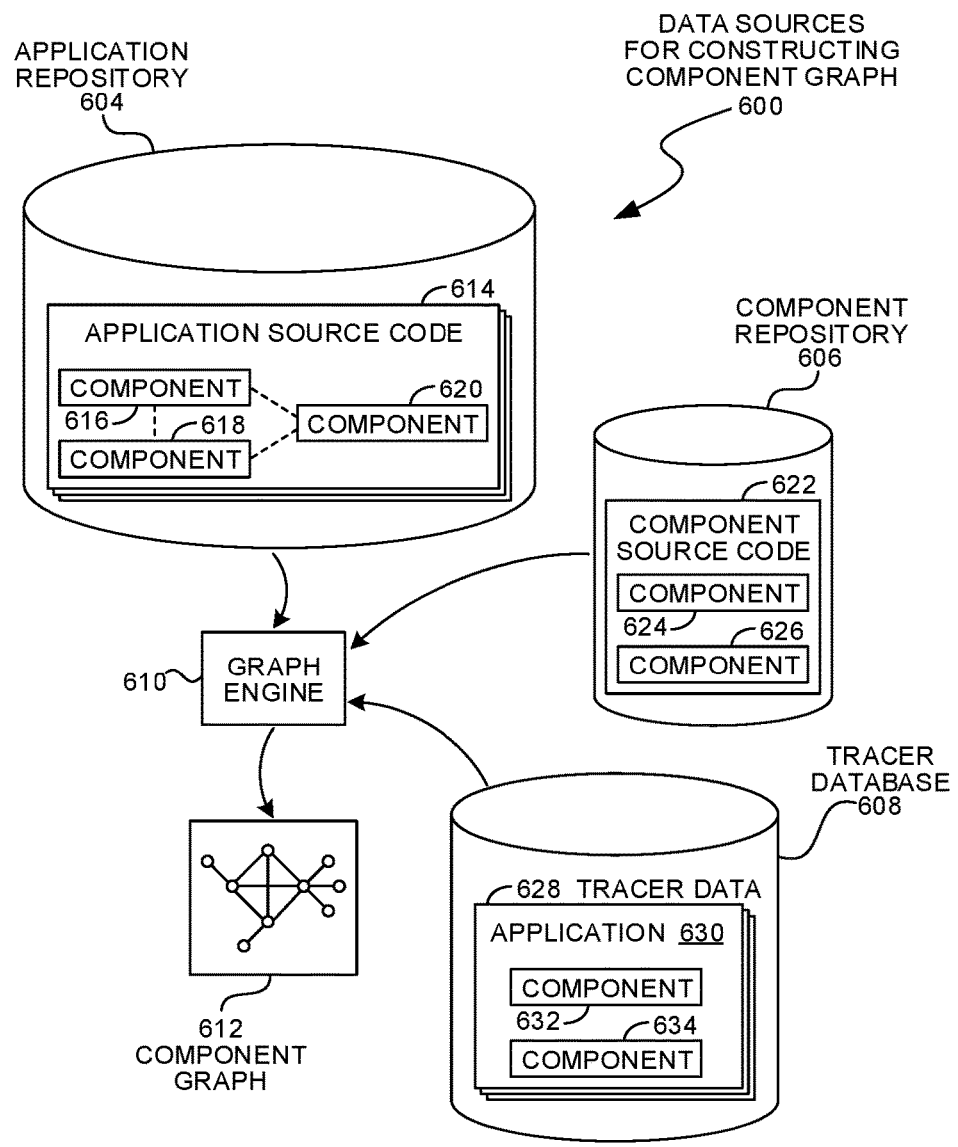
FIG. 6 is a diagram illustration of an embodiment showing a data sources for constructing a component graph.

FIG. 6 is a diagram illustration of an example embodiment 600 showing mechanisms for generating a component graph. Embodiment 600 may illustrate three different sources for data from which components and relationships between the components may be identified.

An application repository 604, component repository 606, and tracer database 608 may each have data from which components and their relationships may be extracted. In some cases, certain types of relationships may be found from one source while other sources may have other types of relationships.

An application repository 604 may contain application source code 614. The application source code may contain multiple versions of the application. In each version, different sets of components 616, 618, and 620 may be present. The presence of multiple components in a single application may indicate an implied relationship between the components. Additionally, a component that may be removed and replaced by a second component in a subsequent version of an application may indicate a mutually exclusive relationship.

A component repository 606 may contain component source code 622. In some cases, a component source code 622 may contain calls to other components 624 and 626. Such calls may indicate an express relationship between the components, as the first component may include or call the other components in a hard coded manner.

A tracer database 608 may include tracer data 628 that may be collected by monitoring applications. In many cases, the trace data may be collected from monitoring many different applications 630, many of which may include reusable software components 632 and 634. Implied and express relationships may sometimes be inferred from trace data, depending on how detailed the trace data may be. In cases where different versions of an application may be traced, mutually exclusive relationships may be inferred.

A graph engine 610 may take data from any of the various sources, such as the application repository 604, component repository 606, and trace database 608 to create the component graph 612. Examples of such processes may be found later in this specification.

Figure 7:
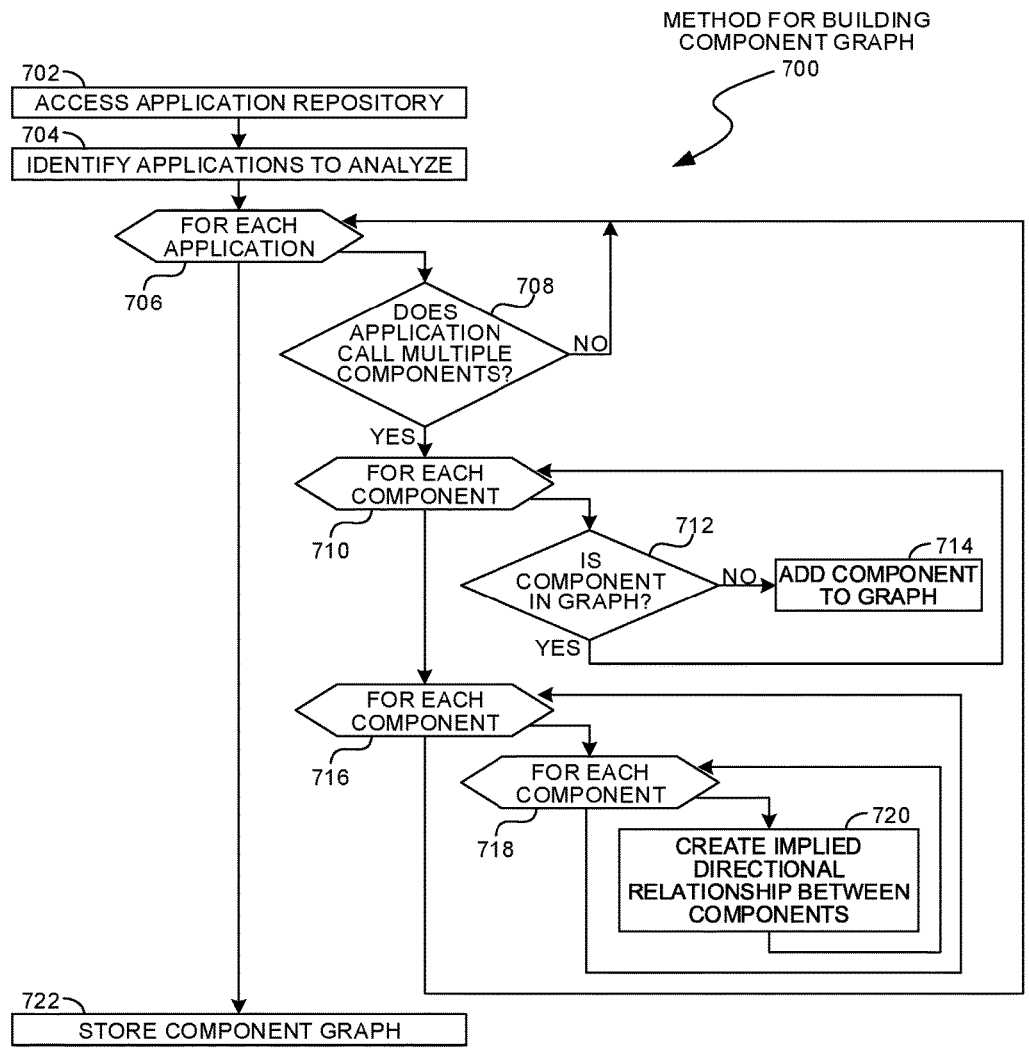
FIG. 7 is a flowchart illustration of an embodiment showing a method for building a component graph from an application repository.

FIG. 7 is a flowchart illustration of an embodiment 700 showing a method for building a component graph. Embodiment 700 may illustrate an example method performed by a graph engine when accessing an application repository to identify reusable software components and implied relationships between the components.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

An application repository may be accessed in block 702. The repository may be a conventional source code repository with multiple versions of an application.

The applications to analyze may be identified in block 704. Each application may be analyzed in block 706. In many cases, the analysis of the application may be performed by static examination of source code. In other cases, the analysis may be performed by examining intermediate code, call traces, or other information.

If the application does not call multiple components in block 708, the process may return to block 706.

If the application does call multiple components in block 708, each component may be analyzed in block 710. If the component is not in a component graph in block 712, the component may be added in block 714.

After adding any new components in block 710, the components may be analyzed in block 716. For each component in block 716, each of the remaining components may be analyzed in block 718 and an implied relationship may be created in block 720. In some instances, an implied relationship may be a directional relationship, where the strength or type of relationship may be different from a first component to a second component than from the reverse direction.

After analyzing each application in block 706, the component graph may be stored in block 722.

Figure 8:
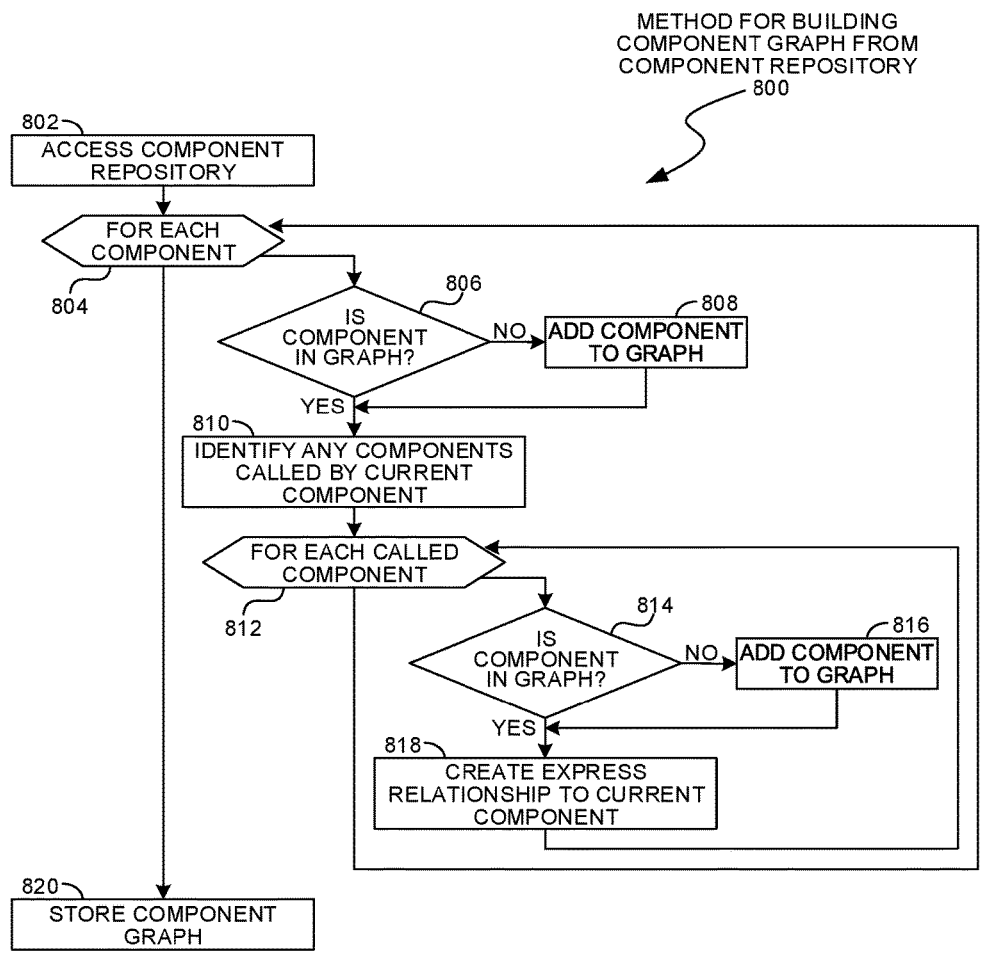
FIG. 8 is a flowchart illustration of an embodiment showing a method for building a component graph from component repository.

FIG. 8 is a flowchart illustration of an embodiment 800 showing a method for building a component graph using data from a component repository. Embodiment 800 may illustrate an example method performed by a graph engine when accessing a component repository to identify reusable software components and express relationships between the components.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A component repository may be accessed in block 802. The repository may be a directory of various components, and may contain metadata, source code, or other information about reusable software components. In some cases, the component repository may serve as a directory to search for components, and the component source code may be located in a different repository.

The components may be analyzed in block 804. For each component, if the component is not in the graph in block 806, the component may be added to the graph in block 808.

The component may be analyzed in block 810 to determine if any components are called from the current component. Each of the called components may be processed in block 812. If the called component is not in the graph in block 814, it may be added in block 816.

An express relationship may be created in block 818.

After processing all of the called components in block 812, the process may return to block 804. After processing all of the components in block 804, the component graph may be stored in block 820.

Figure 9:
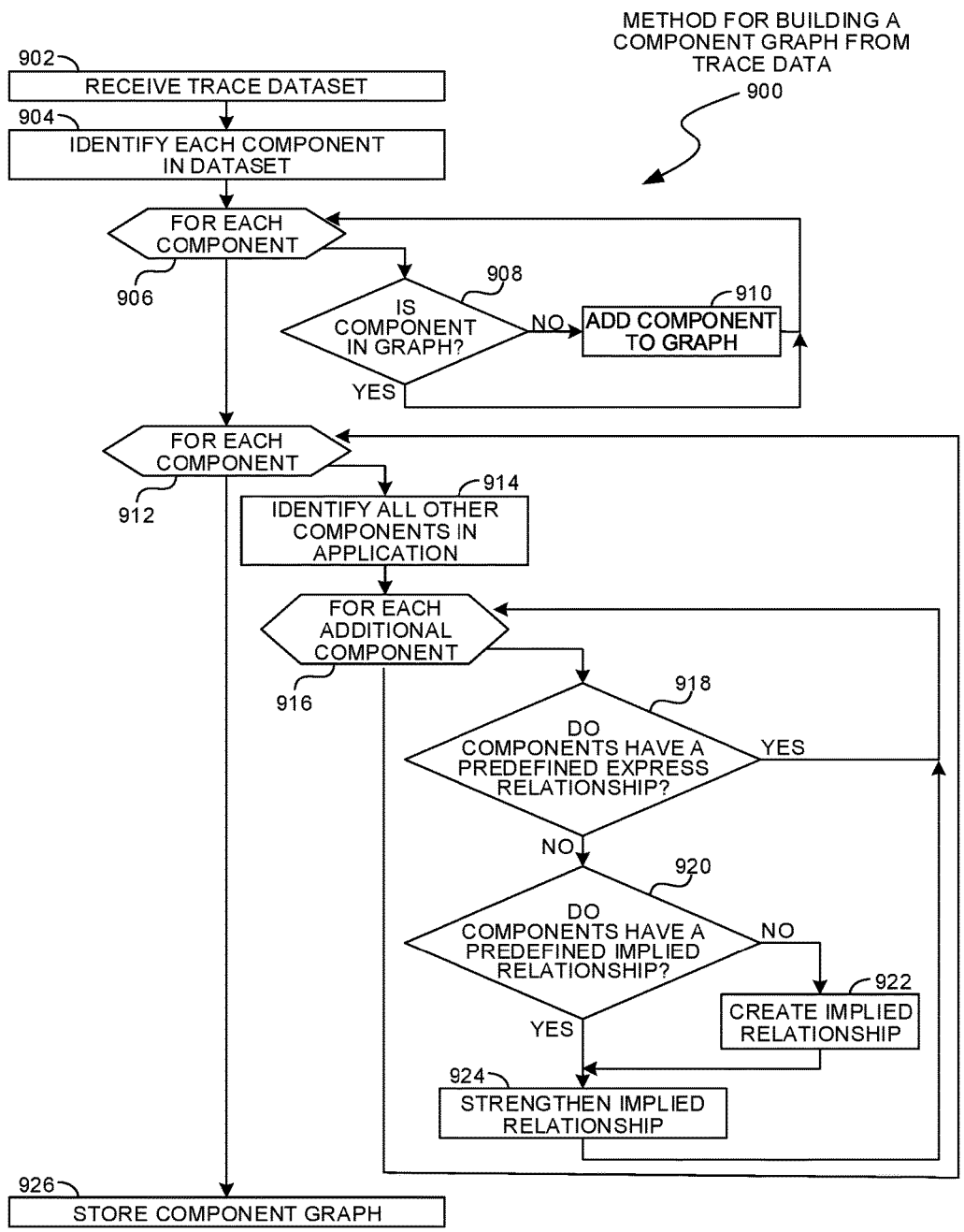
FIG. 9 is a flowchart illustration of an embodiment showing a method for building a component graph from tracer data.

FIG. 9 is a flowchart illustration of an embodiment 900 showing a method for building a component graph from trace data. Embodiment 900 may illustrate an example method performed by a graph engine when accessing a trace database to identify reusable software components and implied relationships between the components. Embodiment 900 illustrates the analysis of a single trace dataset. For a large database, embodiment 900 may be applied to each dataset in the database.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A trace dataset may be received in block 902. The trace dataset may represent tracing data collected by monitoring a single application. Each component within the dataset may be identified in block 904 and separately analyzed in block 906.

For each component in block 906, if the component is not the graph in block 908, the component may be added in block 910.

For each component in block 912, all other components in the application may be identified in block 914. Those additional components may be individually processed in block 916.

If the components from blocks 912 and 916 have a predefined express relationship in block 918, the process may return to block 916 without changing the relationship status. In many embodiments, an express relationship may dominate any implied relationships, such that when an express relationship exists, any implied relationship may be discarded.

If the components from block 912 and 916 do not have a predefined implied relationship in block 920, the implied relationship may be created in block 922. The newly created or predefined implied relationship may be strengthened in block 924.

Many embodiments may include a strength factor for implied relationships. A strength factor may be raised when multiple observations of the same relationship are made.

Figure 10:
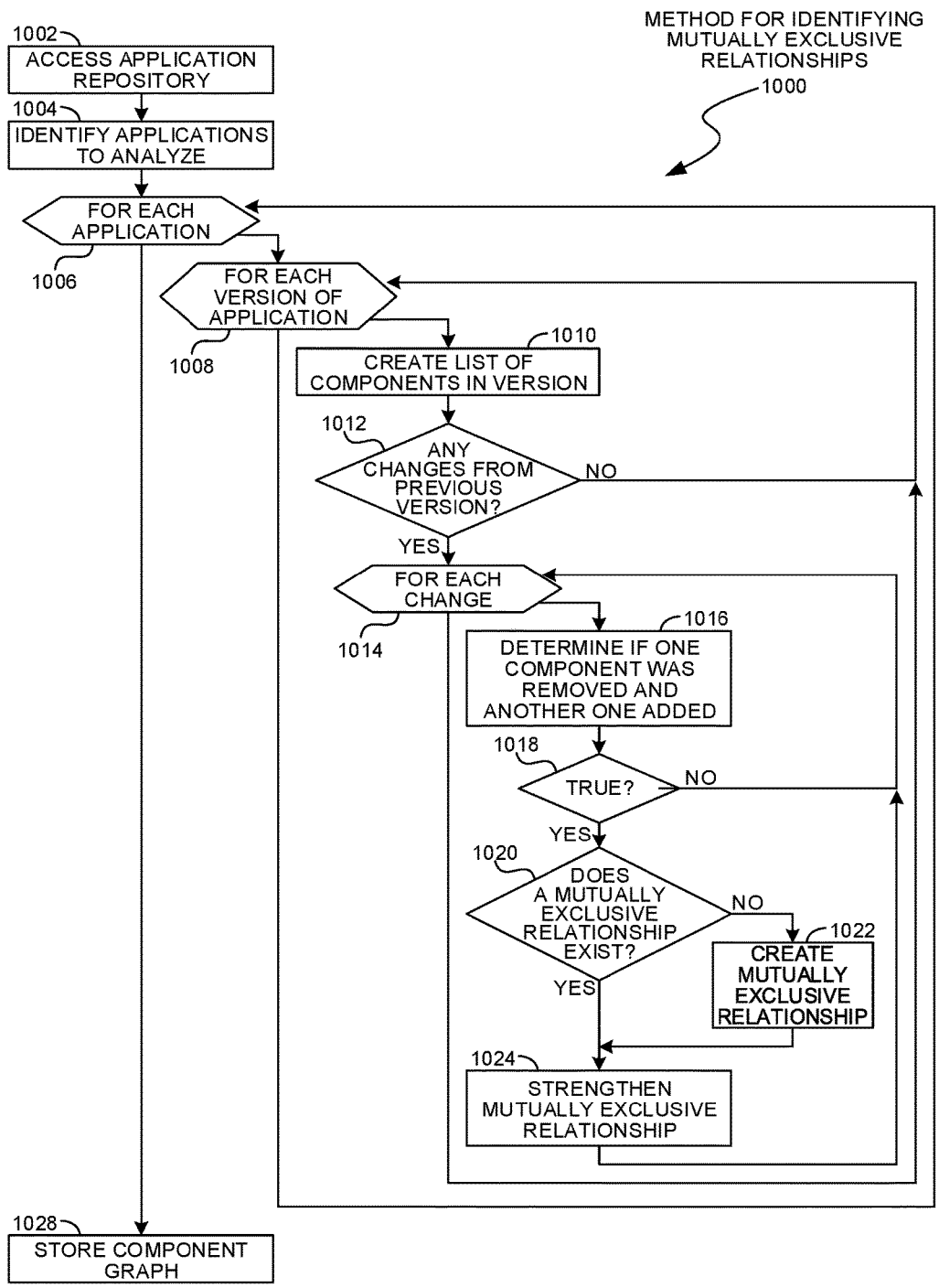
FIG. 10 is a flowchart illustration of an embodiment showing a method for identifying mutually exclusive relationships.

FIG. 10 is a flowchart illustration of an embodiment 1000 showing a method for identifying mutually exclusive relationships. Embodiment 1000 may illustrate an example method performed by a graph engine when accessing an application repository to identify mutually exclusive relationships between the components.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Mutually exclusive relationships may be implied from analyzing different versions of an application. Such relationships may be identified when a developer replaces a component with another component from one version of an application to another. Such relationships may be implied through observations, and such relationships may be significantly strengthened when receiving human input that may confirm that the second component replaced the first.

An application repository may be accessed in block 1002. The applications to analyze may be identified in block 1004. Each application may be processed in block 1006.

For each application in block 1006, each version of the application may be processed in block 1008. For each version of the application in block 1008, a list of components in the version may be generated in block 1010. If there are no changes from the previous version in block 1012, the process may loop back to block 1008.

If changes to the list of components occurred in block 1012, each change may be processed in block 1014.

For each change in block 1014, an analysis may be made in block 1016 to determine if one component was removed and another component added. If such a determination is not true in block 1018, the process may return to block 1014.

If the determination is true in block 1018, an implied mutually exclusive relationship may exist. If such a relationship does not currently exist between components in block 1020, the relationship may be created in block 1022. The newly created or preexisting relationship may be strengthened in block 1024.

After processing all of the changes in block 1014 for each version in block 1008 of each application in block 1006, the component graph may be stored in block 1028.

Figure 11:
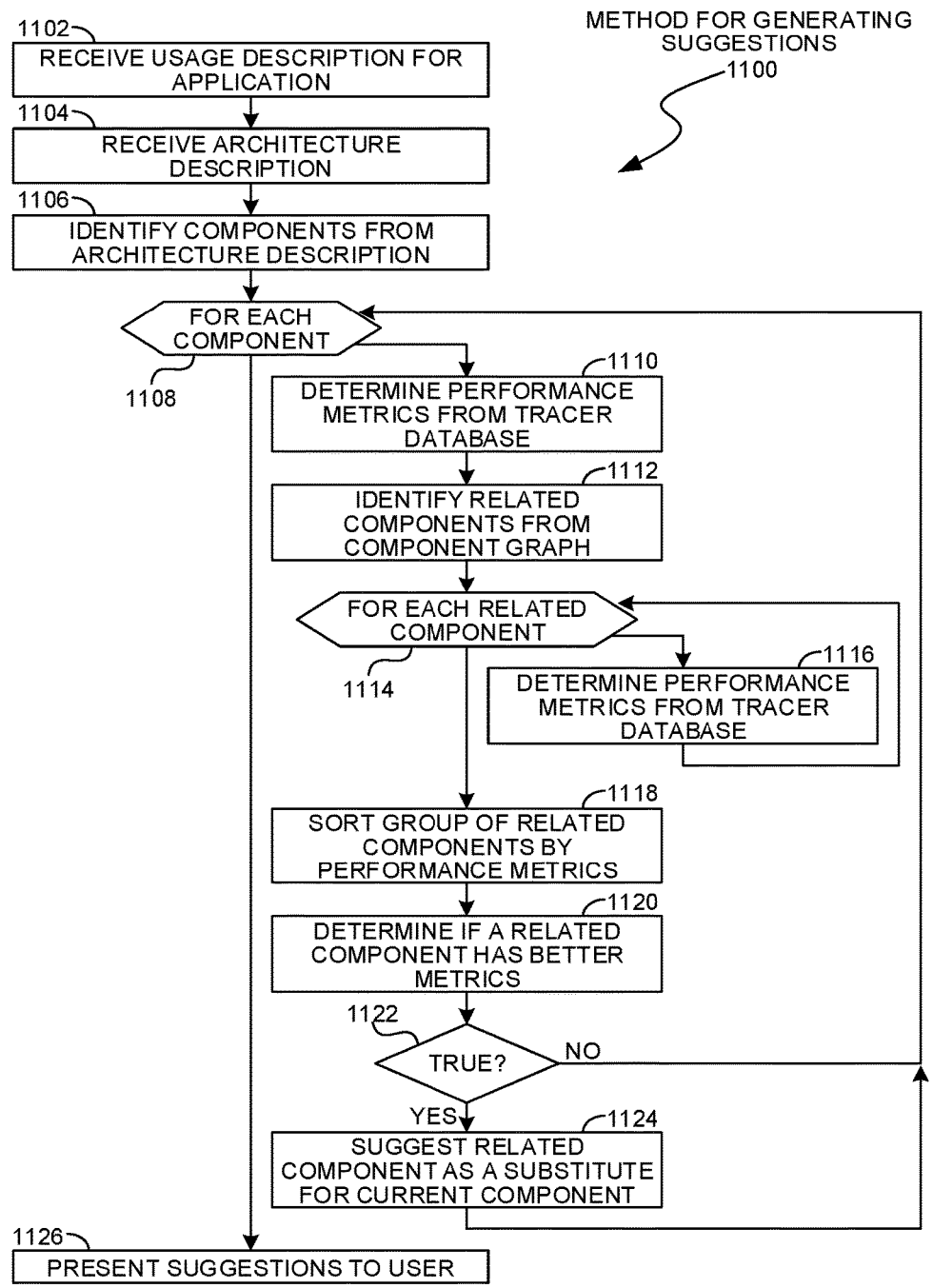
FIG. 11 is a flowchart illustration of an embodiment showing a method for generating suggestions.

FIG. 11 is a flowchart illustration of an embodiment 1100 showing a method for generating suggestions. Embodiment 1100 may illustrate an example method performed by a query engine to combine both performance data derived from trace data and a component graph.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A usage description may be received for an application in block 1102. The usage description may include any parameters that may describe how an application may be used. Such a description may include items like the anticipated workload, desired reliability, or other performance metrics.

An architecture description may be received in block 1104. The architecture description may include hardware and software components on which the application may be executed.

In some cases, the usage description and architecture description may be derived from existing trace data of the application. Such a case may be useful when a recommendation may be generated for an application in production. In other cases, the usage description and architecture description may be a description of anticipated conditions under which an application may be executed.

The architecture description may be analyzed in block 1106 to identify reusable software components. The components may be determined by analyzing source code or from a general description of the application. Each component may be analyzed in block 1108.

For each component in block 1108, a set of performance metrics may be determined for the component. The performance metrics may be derived from a tracer database.

In many cases, the performance metrics may be estimated metrics based on the usage and architecture. Such metrics may reflect the anticipated performance given the anticipated usage and architecture.

A search of the component graph may be made in block 1112 to identify related components. For each related component in block 1114, performance metrics for those components may be determined in block 1116.

The group of related components may be sorted by the performance metrics in block 1118. An analysis of the current components verses the related components may be made in block 1120. If there are related components with better performance metrics in block 1122, the other components may be suggested to the user in block 1124. If no better components exist in block 1122, the suggestions may be omitted.

The suggestions may be presented to a user in block 1126.

Figure 12:
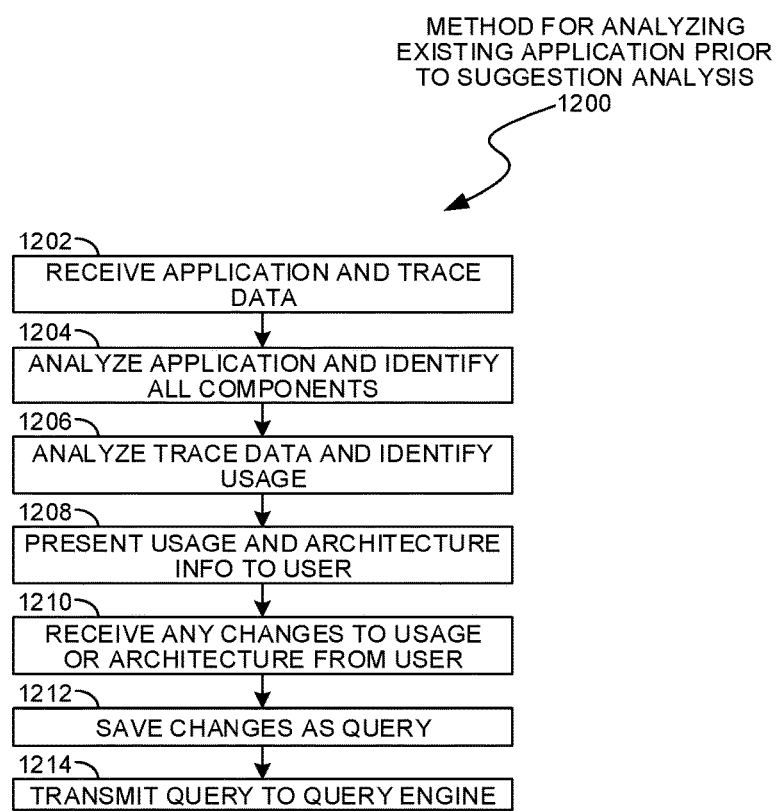
FIG. 12 is a flowchart illustration of an embodiment showing a method for analyzing existing application prior to suggestion analysis.

FIG. 12 is a flowchart illustration of an embodiment 1200 showing a method for constructing a query based on an existing application and trace data. Embodiment 1200 may illustrate an example method performed by an analysis engine that may take existing applications and their trace data to prepare a recommendation query.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

An application may be received in block 1202 along with its trace data.

The application may be analyzed to identify all of its reusable components in block 1204. The analysis may be performed from the trace data, application source code, or other source.

The trace data may be analyzed in block 1206 to identify the usage conditions for the application. The usage conditions may be the actual usage conditions observed during tracing.

The usage and architecture information may be presented to a user in block 1208 and any manually made changes to the observations may be gathered in block 1210. The changes may be saved as a query in block 1212. The query may be transmitted in block 1214. In some embodiments, the query may be processed using a method similar to that of embodiment 1100.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on at least one computer processor, said method comprising:
   receiving a plurality of trace datasets, each of said trace datasets comprising a time series of performance data gathered while monitoring a first software component;
   analyzing said plurality of trace datasets to determine a differentiating factor that causes differences between said trace datasets, wherein determining the differentiating factor also includes identifying a set of one or more complementary components that, when executed, either increased or decreased an effectiveness of the first software component when the first software component was being executed; and
   presenting said differentiating factor or said set of one or more complementary components to a user.

2. The method of claim 1, said differences comprising performance differences between said trace datasets.

3. The method of claim 2, said differentiating factor comprising hardware differences.

4. The method of claim 3, said differentiating factor further comprising software differences.

5. The method of claim 4 further comprising ranking a plurality of differentiating factors.

6. The method of claim 5, said performance data comprising resource consumption data.

7. The method of claim 6, said resource consumption data comprising at least one of a group composed of: processor resource consumption data; memory resource consumption data; and network resource consumption data.

8. The method of claim 6, said performance data comprising usage data.

9. The method of claim 8, said usage data comprising at least one of a group composed of: function call counts; and input parameters receives.

10. The method of claim 2, said first software component being an application.

11. The method of claim 10, a first trace dataset being gathered while executing said application on a first hardware configuration and a second trace dataset being gathered while executing said application on a second hardware configuration.

12. The method of claim 2, said first software component being a reusable software component.

13. The method of claim 12, a first trace dataset being gathered while executing said reusable software component as part of a first application, and a second trace dataset being gathered while executing said application as part of a second application.

14. A system comprising:
    a database comprising a plurality of trace datasets, each of said trace datasets being a time series of performance data gathered while monitoring a first software component;
    at least one processor; and
    an analysis engine operating on said at least one processor, said analysis engine that:
        receives a plurality of trace datasets, each of said trace datasets comprising a time series of performance data gathered while monitoring a first software component; and
        analyzes said plurality of trace datasets to determine a differentiating factor that causes differences between said trace datasets, wherein determining the differentiating factor also includes identifying a set of one or more complementary components that, when executed, either increased or decreased an effectiveness of the first software component when the first software component was being executed.

15. The system of claim 14 further comprising: an interface that receives a first request and returns said differentiating factor as a response to said first request.

16. The system of claim 15, said interface being an application programming interface.

17. The system of claim 14, said first software component being a reusable software component.

18. The system of claim 17, a first trace dataset being collected while executing a first application using said reusable software component and a second trace dataset being collected while executing a second application using said reusable software component.

* * * * *